United States Patent

Yamamoto et al.

[11] Patent Number: 5,386,774
[45] Date of Patent: Feb. 7, 1995

[54] MECHANICAL SENSOR

[75] Inventors: Toshimasa Yamamoto; Seiji Nishide; Yasuho Kitazawa; Keiichi Katoh; Kenji Matsui, all of Aichi, Japan

[73] Assignee: Kabushiki Kaisha Tokairika-Denki-Seisakusho, Aichi, Japan

[21] Appl. No.: 125,806

[22] Filed: Sep. 24, 1993

[30] Foreign Application Priority Data

Sep. 28, 1992 [JP] Japan .................. 4-067428
Aug. 31, 1993 [JP] Japan .................. 5-047331
Aug. 31, 1993 [JP] Japan .................. 5-047407

[51] Int. Cl.⁶ .................. F42C 1/04; B60R 21/08; H01H 35/14; C06D 5/00
[52] U.S. Cl. .................. 102/274; 280/734
[58] Field of Search .................. 102/274, 272, 252; 280/734; 200/61.53; 74/492

[56] References Cited

U.S. PATENT DOCUMENTS 3,638,501 2/1972 Prachar .................. 102/253
4,864,086 9/1989 Akiyama et al. .................. 200/61.53
4,889,068 12/1989 Tabata et al. .................. 102/274
4,938,140 7/1990 Kinoshita et al. .................. 102/274

FOREIGN PATENT DOCUMENTS 442769 4/1912 France .
3742961 7/1988 Germany .
3908117 9/1990 Germany .

Primary Examiner—David Brown
Attorney, Agent, or Firm—Fisher & Associates

[57] ABSTRACT

Upon a sudden deceleration of a vehicle, if an inertial body moves a predetermined amount against the urging force of a return spring, the trigger means will be released from engagement with the firing pin. Under the urging force of a spring, the firing pin is released from engagement with the trigger means, strikes and ignites a detonator so as to activate the actuator. The trigger means will not move until the inertial body has moved by the predetermined amount. Only after the inertial body has moved the predetermined amount, will the trigger means start to move suddenly and quickly. Therefore, friction at the time the inertial body engages the trigger means is kept constant. The stable operation of the sensor is thereby assured.

20 Claims, 4 Drawing Sheets

MECHANICAL SENSOR

BACKGROUND OF THE INVENTION

1. Field of the Invention

The present invention relates to a mechanical sensor for sensing a sudden deceleration of a vehicle.

2. Background Information

Among known vehicle seat belt units there are those equipped with a so-called pretensioner. At the time of a sudden acceleration (including deceleration) of the vehicle, the pretensioner retracts the webbing which a passenger is wearing by a predetermined amount so as to forcefully take up slack in the webbing thereby improving the restraint of the passenger.

In pretensioners of this type the tautness of the webbing is caused by the forced rotation of the webbing retractor shaft, while other types cause the tension of the webbing by a forced pull of the buckle. A pretensioner of the type that pulls the buckle to tension the webbing, for example, is equipped with a gas generator having a mechanical igniting sensor. The gas generator, which is provided with a cylinder, is connected to a buckle via a wire or the like.

At a sudden deceleration of a vehicle, the mechanical igniting sensor senses the deceleration so as to activate the gas generator. The instantaneous generation of gas moves the cylinder so that the force of the movement is transmitted to the buckle via the wire so as to tension the webbing.

The mechanical igniting sensor employed in a pretensioner of this prior art is basically composed of an ignition pin that fires a detonator, an inertial body that is moved inertially due to a large acceleration, a trigger member such as a ball that is present between the ignition pin and the inertial body so as to restrain the ignition pin from moving. One example is seen in U.S. Pat. No. 3,638,501. In this mechanical igniting sensor, in which only the above-mentioned trigger member is provided between the inertial body and the ignition pin so as to prevent the ignition pin from moving out of its normal state, there are many factors which affect precision(the sensitivity of the operation of the mechanical igniting sensor) during operation from the inertial movement of the inertial body that releases the hold on the ignition pin to the subsequent firing of the detonator. For example, there are directional differences between the pressure that the ignition pin applies to the trigger member and the pressure that the trigger member applies to the inertial body. Furthermore, these pressure directions change with the movement of the inertial body. There are other elements that affect the sensitivity of the operation of the mechanical igniting sensors. For example, the frictional force between the trigger member and the inertial body changes greatly during the movement of the inertial body. Because of these factors, the sensitivity of the operation is not steady, and a stable sensor operation is difficult to obtain. In some cases, the pressure on the trigger member coming from the ignition pin can be amplified because of the change in the direction of the pressure. In such cases, the amplified pressure given to the inertial body increases the frictional force between the trigger member and the inertial body. As a result, it causes the dispersion of sensitivity and the loss of operation stability.

In addition, the pressing forces on the trigger member of the mechanical igniting sensor in the prior art tend to counteract each other. It is therefore possible that the trigger member will fail to move as it should or stall even under a predetermined inertial force.

In this case, to simply increase the inertial mass so as to decrease the effects of the frictional force between the trigger member and the inertial body would only increase the size and weight of the unit as a whole.

Furthermore, in the operation of the mechanical igniting sensor in the prior art, once the trigger member has come out from between the inertial body and the ignition pin and the firing pin has been released from constraint, it is extremely difficult to reset the sensor to a state in which the movement of the ignition pin is prevented.

To test the mechanical igniting sensor, it is possible to test the sensor with respect to sensitivity and other operational properties and confirm the exactness of the operation. However, it is not possible to combine the tested sensor with a gas generator so that the unit will become operational reset. A solution to this problem, therefore, is needed for it is not possible to Omit the test operation of the mechanical igniting sensor.

SUMMARY OF THE INVENTION

In consideration of the above, it is an object of the present invention to provide a mechanical sensor having a simple structure that is able to reduce the unwanted effects of frictional force and insure stable sensor operation.

Another object of the present invention is to provide a mechanical sensor having a simple structure that can be reset easily after a test operation of sensitivity and the like without sacrificing stability of operation.

The mechanical sensor of the present invention is structured such that when the inertial body moves, the inertial body and the trigger lever move relative to each other while maintaining linear contact.

In other words, when the slide holding portion of the trigger lever is separated and released from the inertial mass body, the trigger lever is freed so as to rotate about its supporting shaft. As a result, the ignition pin that is urged by a firing spring rotates the trigger lever in a direction so as to separate the trigger lever from the ignition pin. This releases the ignition pin from engagement with the engaging portion of the trigger lever. The ignition pin then is moved by the urging force of the firing spring in the axial direction to fire the detonator.

During the operation of the sensor, the inertial mass body moves in its linear contact with the slide holding portion of the trigger lever. As a result, friction between the trigger lever (slide holding portion) and the inertial mass body remains constant, thus contributing to the stable sensitivity of the mechanical ignition sensor during operation.

In addition, friction between the slide holding portion and the inertial mass body can be easily reduced to increase the effects of the trigger lever if the lever ratios between the supporting shaft and the slide holding portion, and the supporting shaft and the engaging portion are set properly.

In this way, the mechanical sensor of the present invention is able to insure stable operation by reducing the unwanted effects of friction between the trigger lever and the inertial mass body without increasing the mass of the inertial body.

Various means of moving the trigger device can be adopted so that the trigger means remains unmoving until the inertial body has moved a predetermined amount. The intertial body will move quickly and sharply once the inertial body has moved the predetermined amount. The measures that may be used for this purpose include the formation of a block-like portion on the inertial body and/or the trigger means where the two come into contact with each other, and the formation of a step or edge in which the inertial body, toward the end of its movement, will suddenly separate from the trigger means.

It is possible to provide an interfering portion on the trigger lever that interferes with a portion of the firing pin which, having finished operation, will be returning to the original position. Here, the return of the firing pin will cause the resetting of the trigger lever.

In this way, a simple return of the igniting pin along an axial line toward the initial position can cause the trigger lever to rotate to the initial position in which the firing pin is held in place. This will allow an easy post-testing resetting. The mechanical igniting sensor having undergone an operation test is then assembled with a gas generator to become an operating unit.

A spring can urge the inertial mass body in a direction so as to enter the locus of movement of the trigger lever. In this manner, the inertial body will impart a force to the trigger lever so as to engage the firing pin. In this setting, the resistance of the firing pin toward the initial position will engage the pin with the trigger lever and reset the unit.

DESCRIPTION OF THE PREFERRED EMBODIMENT

Figure 1:
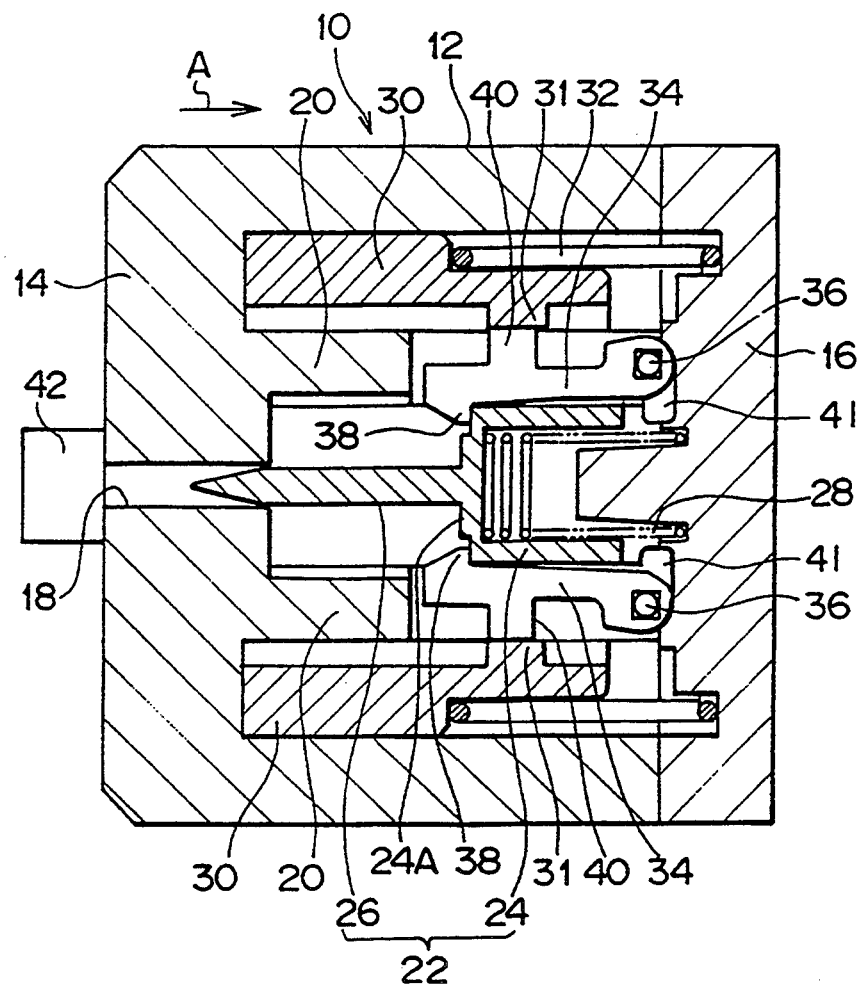
FIG. 1 is a cross sectional view illustrating the initial state of a mechanical sensor according to a first embodiment of the present invention.
Figure 2:
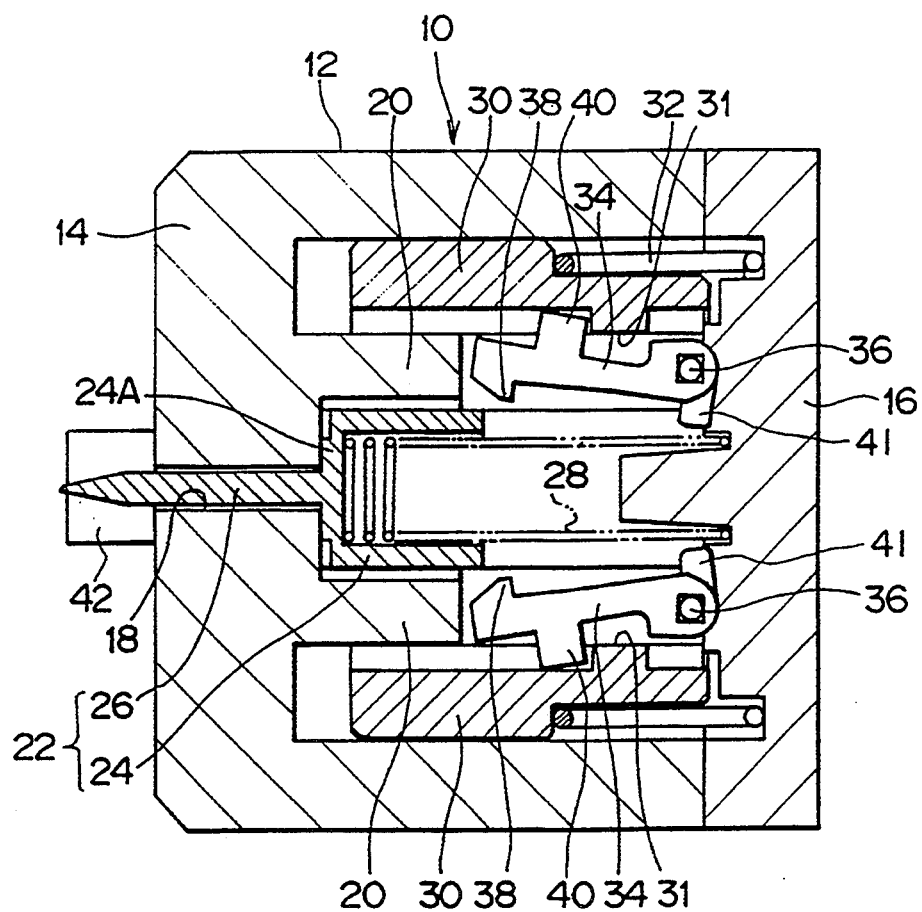
FIG. 2 is a cross sectional view illustrating the state of the mechanical sensor after having finished operation in accordance with the first embodiment of the present invention.

FIGS. 1 and 2 show cross sectional views of a mechanical igniting sensor 10 of the present invention.

The mechanical igniting sensor 10 has a case 12. The case 12 is shaped as a cylinder having a bottom wall 14 at one end. The open side of the case 12 is sealed by a plate 16. In the bottom wall 14 of case 12 a hole 18 penetrates axially therethrough. In the bottom wall 14 a guide 20, which is of a substantually cylindrical shape, is formed coaxially so as to protrude toward the inner direction of the case 12.

Inside the case 12 is a firing pin or ignition pin 22. The ignition pin 22 is composed of a main body 24 which is substantually cylindrical in form, and a projecting portion 26, that is integrally formed with the bottom wall 24A of the main body 24. The outside diameter of the main body 24 corresponds to the inside diameter of the guide 20. The main body 24 is slidable within the guide 20 along an axial line in the case 12. As indicated in FIG. 2, when the ignition pin 22 (main body 24) has moved toward the bottom wall 14 of the case 12 as far as it can go, the projecting portion 26 projects out of the penetration hole 18 that is formed in the bottom wall 14.

A firing spring 28, which is provided between ignition pin 22 and the plate 16, normally urges the ignition pin 22 in the direction of the penetration hole 18.

Provided around the guide 20 is an inertial mass 30. The inertial mass 30, which is substantually in a cylindrical shape, is accomodated between the surrounding walls of the case 12 and the guide 20 so as to be movable. A biasing spring 32 are placed between the inertial mass 30 and the plate 16 so as to constantly urge the inertial mass 30 against the bottom wall 14.

Arranged between the inertial mass 30 and the ignition pin 22 are a pair of trigger levers 34. An end portion of each trigger lever 34 is rotatably supported to a shaft 36. The other end of the trigger lever 34 is bent toward the ignition pin 22 to form an engaging portion 38 so as to be engagable with the ignition pin 22. In other words, the trigger lever 34 rotates around the shaft 36 in such a way that the engaging portion 38 can move toward or away from the ignition pin 22. In a state in which the engaging portion 38 of the trigger lever 34 has engaged the main body 24 of the ignition pin 22 as indicated in FIG. 1, the ignition pin 22, under the urging of the firing spring 28, is held in a position in which its projected portion 26 is drawn out of the penetration hole 18.

In a longitudinal middle portion of the trigger lever 34 and on the side opposite ignition pin 22 a slide holding section 40 projects toward the inertial mass 30. The slide holding section 40 corresponds to a sliding portion 31 formed on the inertial mass 30, and is structured so that it will remain in linear contact with the sliding section 31. Normally the inertial mass 30 is urged by the bias spring 32 against the bottom-most part of bottom wall 14 of case 12. In this state, the sliding portion 31 of the inertial mass 30 is contact with the slide holding section 40 of trigger lever 34. The engaging portion 38 of the trigger lever 34 is engaged with the main body 24 of the ignition pin 22, and holds the projecting portion 26 of the ignition pin 22 in a position that is drawn out from the penetration hole 18. Further, when the inertial mass 30 moves so as to be separated from the bottom wall 14, the sliding section 31 of the inertial mass 30 and the slide holding portion 40 of the trigger lever 34 maintains linear contact while moving relative to each other.

The slide portion 31 may be brought into contact with the slide holding portion 40 on the surface of a semicircular arc which has its center on an axis that is parallel to the axial line of the ignition pin 22. The slide holding portion 40 may also have a similar arc surface where it makes contact with the slide section 31.

In addition, at the rear end of the trigger lever 34 (the end opposite engaging section 38) a pressing projection 41 is provided, which faces the ignition pin 22. As shown in FIG. 2, the sizes and other specifications of the pressing projection 41 have been determined so that the projection 41 can enter the locus of movement of the ignition pin 22 and engage the rear end thereof once the trigger lever 34 has rotated and released the hold of the engaging portion 38 on the ignition Pin 22. With this, the sliding of the ignition pin 22 away from the penetration hole 18 can cause the rear end of the ignition pin 22 to press the projection 41.

The mechanical igniting sensor 10 with the above-described structure is assembled to, for example, a gas generator used with a pretensioner (not illustrated). The gas generator contains a gas-generating agent. There is also a detonator 42 for igniting and combusting the gas-generating agent. After the mechanical ignition sensor 10 and the gas generator are assembled, the detonator 42 is located on the axial line of the mechanical ignition sensor 10. In this state, the penetration hole 18 in the case 12 faces the detonator 42, so that the projecting portion 26 of the ignition pin 22 can project through the penetration hole 18, and strike the detonator 42.

Next, the operation of the present embodiment will be explained.

In the mechanical igniting sensor 10 with the above described structure, normally the ignition pin 22 is in the position shown in FIG. 1. That is, the ignition pin 22 is separated from the detonator 42 against the bias force of the firing spring 28 (in a position drawn out of the penetration hole 18 in the case 12). In this position, the engaging portion 38 of the trigger lever 34 is engaged with the main body 24 of the ignition pin 22, thus holding the ignition pin 22 from moving. The inertial mass 30, pressed by the bias spring 32, has come to the bottom-most part of the bottom wall 14, that is, in the locus of the rotation of the trigger lever 34. The slide portion 31, coming into contact with the slide holding portion 40 of the trigger lever 34, prevents the trigger lever 34 from rotating, thereby keeping hold on the ignition pin.

When a sudden acceleration activates the mechanical ignition sensor 10, the inertial mass 30 inertially moves in the direction of an arrow A, and separates from the rotation locus of the trigger lever 34.

The inertial mass 30 (slide section 31) moves while maintaining linear contact with the slide holding section 40 of the trigger lever 34. Once the slide holding section 40 of the trigger lever 34 is separated from the slide section 31 of the inertial mass 30 and holding released, the trigger lever 34 is the rotatable around shaft 36. Thereby, the ignition pin 22 presses the trigger lever 34 in such a direction that the trigger lever 34 will be rotated and separated from the ignition pin 22. The engaging portion 38 of the trigger lever 34 is then disengaged from the main body 24 of the ignition pin 22, thereby releasing the holding of the ignition pin 22. As a result, the ignition pin 22, under the urging of the firing spring 28, moves in the axial direction, causing the projecting portion 26 to protrude through the penetration hole 18 (see FIG. 2).

This causes the projecting portion 26 of the ignition pin 22 to strike the detonator 42 and ignite it. Upon igniting the detonator 42, the gas-generating agent in the gas generator ignites and combusts thereby activating a pretensioner, for example.

During the operation of the mechanical ignition sensor 10, that is, during the movement of the inertial mass 30, the frictional force between the trigger lever 34 (slide holding portion 40) and the inertial mass 30 (slide portion 31) is constant and without fluctuations because the slide portion 31 moves while maintaining linear contact with the slide holding portion 40 of the trigger lever 34. In other words, the direction in which the ignition pin 22 pushes the trigger lever 34 and the direction in which the trigger lever 34 presses the inertial mass 30 do not vary as they do in the prior art. Accordingly, the frictional force between the trigger lever 34 (slide holding portion 40) and the inertial mass 30 (slide portion 31) does not markedly change as the inertial mass 30 moves. As a result, the sensitivity of the mechanical ignition sensor 10 is stabilized.

Furthermore, the suitable setting of the trigger lever 34, as to the lever ratios between the shaft 36 and the slide holding portion 40, and the shaft 36 and the engaging portion 38 will enhance the effects of the sensor by reducing the frictional force between the aforementioned trigger lever 34 (slide holding portion 40) and the inertial mass 30 (slide portion 31). For example, by bringing the slide holding portion 40 closer to the shaft 36, such enhanced effectiveness can be expected.

In the mechanical ignition sensor 10, various pressing forces on the trigger lever 34 do not cancel each other while the inertial mass 30 is moving. Accordingly, once a predetermined inertial force starts working, the inertial mass 30 and the trigger lever 34 are prevented from stopping midway.

Once the mechanically ignition sensor 10 is activated and the ignition pin 22 has moved, the pressing projection 41 of the trigger lever 34 has entered the locus of movement of the ignition pin 22 facing to the rear end of the ignition pin 22, so as to be ready to engage therewith.

Next, to return an already activated mechanical ignition sensor 10 to a state ready for another operation (i.e., to reset), the ignition pin 22 can be moved in the axial direction against the urging force of the firing spring 28.

To implement this resulting, the projecting portion of the ignition pin 22, which projects out of the penetration hole 18, is pressed in the direction of the plate 16 from the outside of the case 12 using a jig or the like.

With the movement of the trigger lever 34 toward the side of plate 16 the ignition pin 22 presses the pressing projection 41 of the trigger lever 34, which has entered the locus of movement of the ignition pin 22. As a result, the trigger lever 34 is rotated about the shaft 36 in such a manner that the engaging section 38 approaches the ignition pin 22. When the ignition pin 22 has reached the initial position, the engaging portion 38 reengages the ignition pin 22 (bottom wall 24A of the main body 24) and holds the ignition pin 22 in its initial position which is away from the detonator 42. Furthermore, as the trigger lever 34 rotates, the inertial mass 30, which is pressed by the bias spring 32, reenters the locus of the rotation of the trigger lever 34 so as to stop the rotation and initiate the ignition pin-holding state.

As described above, the mechanical ignition sensor 10 assures stable operation by decreasing the unwanted effects of the frictional force between the trigger lever 34 and the inertial mass 30. In addition, by merely pressing the ignition pin 22 from outside to return it to the initial position, the trigger lever 34 is rotated to return to its initial position in which the ignition pin 22 is held. Accordingly, the mechanical ignition sensor 10 having undergone an operation test before it is assembled with a gas generator may thereafter be assembled with the gas generator and easily reset to the operative state.

Next, a second embodiment of the present invention will be described with reference to FIGS. 3 and 4. In this example, those parts that function in the same way as those parts in the first embodiment will have the same numbers assigned as those found in FIGS. 1 and 2 except for the addition of "A" at the end of each number.

In this embodiment, a flange portion 24C is formed on the ignition pin main body 24B at the end opposite the projecting portion 26A. The flange portion 24C is larger in diameter than the other part of the firing pin main body 24A. The flange portion 24C engages the L-shaped distal end portion of the trigger lever 34A. The L-shape portion serves as the engaging portion 38A, via a through hole 20B of the cylindrical guide 20A. On the side of the trigger lever 34A that is opposite to the side of the engaging section 38A a small diameter step portion 30B of the inertial mass 30A is provided. The small diameter step portion 30B is in contact with the trigger lever 34A on the other side of the engaging section 38A and thus maintains the engagement of the trigger lever 34A with the ignition pin main body 24B. The inertial mass 30A of this embodiment is also pressed by the bias spring 32A. However, the direction in which the inertial mass 30A is pressed is opposite to the direction in which the inertial mass 30 in the first embodiment was pressed (opposite direction indicated by arrow A). The inertial mass 30A of this embodiment is biased in the direction opposite to the biasing direction of the ignition pin.

On the L-shaped bent portion of the trigger lever 34A a chamfer-shaped sloped surface 34B is formed so that the sloped surface 34B corresponds to the small diameter step portion 30B. When the trigger lever 34A rotates so as to take the engaging portion 38A out of the through hole 20B in the guide 20A (FIG. 2), the sloped surface 34B corresponds to the step portion 30B.

An acceleration sensor 10A with a structure like that described above may be assembled with a gas generator 50 for use as a pretensioner, for example.

Figure 3:
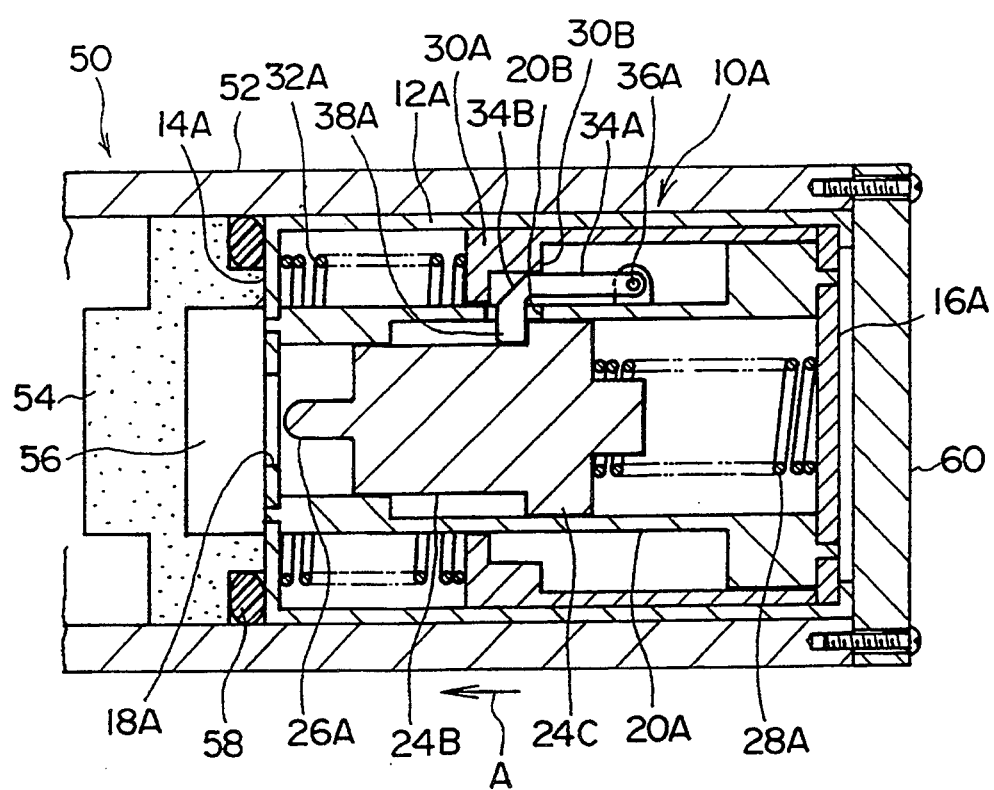
FIG. 3 is a cross sectional view illustrating the initial state of a mechanical sensor according to a second embodiment of the present invention.

As shown in FIG. 3, inside a cylindrically shaped main body 52 of the gas generator 50 a gas-generating agent 54 is accomodated. A detonator 56 that will cause the ignition and combustion of the gas-generating agent 54 is also in the main body 52. A detonator 56 is located in the axial center portion of the main body 52. The acceleration sensor 10A faces the detonator 56. A shielding ring 58 is provided between the acceleration sensor 10A and the detonator 56. The sensor is then sealed and secured by a plate 60. In a state in which the acceleration sensor 10 has been assembled with the main body 52, the penetration hole 18A in the sensor cover 14A faces the detonator 56, and the projecting portion 26 of the ignition pin can protrude through the penetration hole 18A so as to strike the detonator 56.

Next, the operation of the second embodiment will be explained.

FIG. 3 represents the state of the sensor 10A during the normal operation of the vehicle. In this state the ignition pin main body 24B is held by the trigger lever 34A.

When the acceleration sensor 10A senses the sudden deceleration of the vehicle, the inertial mass 30A moves in the direction of arrow A, against the urging force of the bias spring 32A. As a result of this movement, the restrictions imposed on the trigger lever 34A are released by the inertial mass 30A. The trigger lever 34A is now free to rotate. The ignition pin main body 24B is moved in the direction of arrow A by the urging force of the firing spring 28A, and strikes and ignites the detonator 56. The resultant ignition and combustion of the gas-generating agent 54 in the gas generator 50 activate the pretensioner.

In this state, the step portion 30B of the inertial mass 30A is in contact with the sloped surface 34B. It is therefore possible to reset the ignition pin by moving the pin in the axial direction against the urging force of the firing spring 28A.

Figure 4:
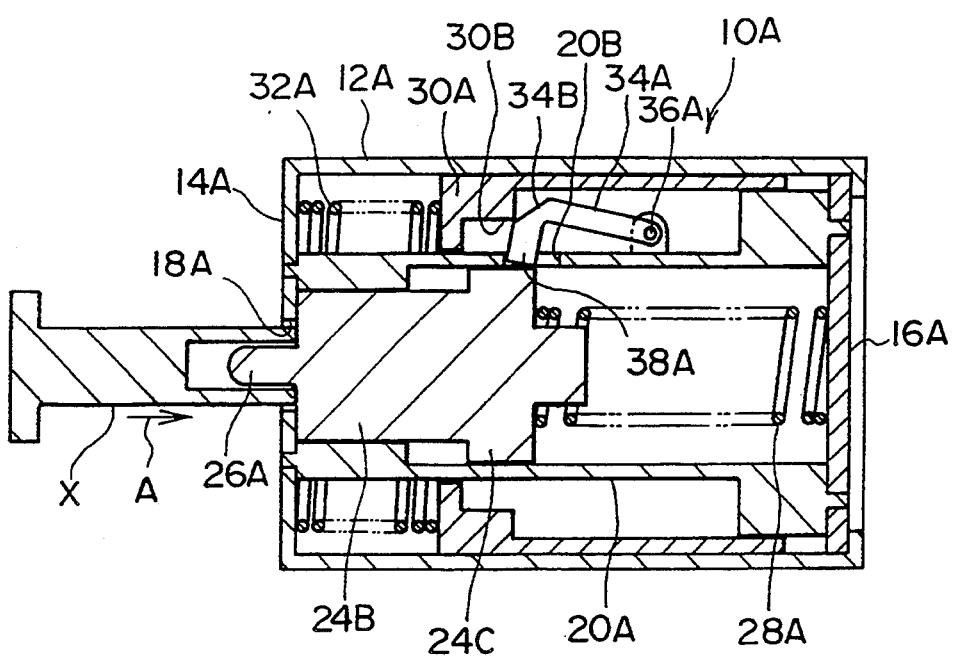
FIG. 4 is a cross sectional view illustrating the state of the mechanical sensor after having finished operation in accordance with the second embodiment of the present invention.

As shown in FIG. 4, the ignition pin main body 24B with its projecting portion 26A protruding from the penetration hole 18A is pressed by jig X from outside of the sensor case 12A so as to move jig X into the guide 20A (in the direction of arrow A in FIG. 4). This causes the step portion 30B of the mass body 30A which is pressed by the bias spring 32A to press the trigger lever 34A in the direction of the ignition pin main body 24B via its sloped surface 34B. As a result, the ignition pin main body 24B moves to the initial position. At this point, the engaging section 38A of the trigger lever 34A engages the flange 24C of the ignition pin main body 24B, holds the ignition pin main body 24B in the initial position, and reset the sensor 10A.

In the above-described embodiment, the slope of the sloped surface 34B may be a curved surface instead of a straight sloped surface in the figure. The radius of curvature of the curved surface may be selected arbitrarily. Also, the sloped surface 34B does not necessarily have to be provided on the trigger lever 34A. It may be provided on the inertial mass 30A, as long as it is a sloped surface that can transmit via the inertial mass 30A the force of the bias spring 32A as the force that returns the trigger lever 34A.

In the previously described mechanical ignition sensor 10, the firing pin 22 was held by a pair of the trigger lever 34. However, the number of trigger levers is not limited. There may be one or three or more levers 34.

In addition, the previously described mechanical ignition sensors used a gas generator type pretensioner. However, the application of the sensors are not restricted to this use. It is possible to apply these sensors to other systems that will act upon the impact of a firing pin such as an air bag system that will inflate a bag in front of a passenger during an emergency of the vehicle.

What is claimed is:

1. A mechanical sensor to activate an actuator comprising:
   activating means for moving in a direction of an axis thereof and for making contact with said actuator;
   urging means for urging said activating means in a direction of contact with said actuator;
   trigger means being pivotally provided and being capable of moving to a position in which said trigger means is engaged with said activating means so as to hold said activating means in a state separating from said actuator, and being capable of moving to a position in which said trigger means is separated from said activating means;
   an inertial body capable of moving, parallel to a direction of an axis of said activating means, from an initial state in accordance with a level of acceleration which in said initial state maintains engagement of said trigger means with said activating means while in a state moved from said initial state said inertial body separates said trigger means away from said activating means;
   inertial body urging means for keeping said inertial body in said initial state until a predetermined acceleration is reached; and
   said trigger means and said activating means having respectively at least one linearly contacting portion to contact each other for making possible the relative movement of both of said contacting portions in a linearly contacted state during occurrence of said predetermined acceleration of a vehicle, and a quick separation of said trigger means from said activating means once said inertial body has moved a predetermined amount.

2. The mechanical sensor of claim 1 in which a sloped surface is formed between said inertial body and trigger means in such a manner that said sloped surface will guide movement of said trigger means caused by said urging movement of said inertial body in a direction of engaging with said activating means.

3. The mechanical sensor of claim 1 in which said activating means includes a step portion, and a sloped surface is formed on said trigger means and said step portion of said activating means.

4. The mechanical sensor of claim 1 in which said activating means is comprised of an ignition pin for activating said actuator to ignite a charge of said actuator.

5. The mechanical sensor of claim 4 in which said inertial body is provided outward and parallel to said ignition pin and said inertial body and ignition pin move linearly such that they remain parallel to each other.

6. The mechanical sensor of claim 5 in which said trigger means is a trigger lever rotatably supported by a shaft.

7. The mechanical sensor of claim 5 in which said trigger means is rotatably supported by a shaft and engages said ignition pin with one end, and engages said inertial body with an intermediate portion.

8. The mechanical sensor of claim 5 in which the area where said trigger means makes contact with said inertial body is a flat surface formed on a projecting end of said trigger means.

9. The mechanical sensor of claim 5 in which the area where said inertial body makes contact with said trigger means is a flat surface formed on an end of a projected portion of said inertial body.

10. The mechanical sensor of claim 5 in which the area where said trigger means makes contact with said inertial body is formed on an end of a block portion projecting out from said trigger means, while a portion where said inertial body makes contact with said trigger means is formed at an end of a block projecting from said inertial body.

11. An acceleration sensor for activating an ignition means at a time of sudden deceleration of a vehicle comprising:
   an inertial body that moves during said sudden deceleration of said vehicle;
   a firing pin that is employed to strike said ignition means;
   trigger means being pivotally provided for holding said firing pin in a position separated from said ignition means during a normal state of said vehicle, and releasing said firing pin when said inertial body moves;
   urging means for urging said firing pin in a striking direction of said ignition means; and
   means for maintaining engagement of said trigger means with said firing pin until said inertial body is moved a predetermined amount, by acceleration, and for moving said trigger means quickly and sharply away from said firing pin one in which said inertial body has moved said predetermined amount, parallel to a direction of an axis of said firing pin.

12. The mechanical sensor of claim 11 in which each of said firing pin and said inertial body are guided so as to move in a straight line.

13. The mechanical sensor of claim 11 in which said trigger means is a trigger lever rotatably supported by a shaft.

14. The mechanical sensor of claim 11 in which said trigger means is rotatably supported by a shaft which engages said firing pin and an intermediate portion of which engages said inertial body.

15. The mechanical sensor of claim 11 in which the area where said trigger means makes contact with said inertial body is a flat surface formed on a projecting end of said trigger means.

16. The mechanical sensor of claim 11 in which the area where said inertial body makes contact with said trigger means is a flat surface formed on an end of a projected portion of said inertial body.

17. The mechanical sensor of claim 11 in which the area where said trigger means makes contact with said inertial body is formed on an end of a block portion projecting out from said trigger means while the portion where said inertial body makes contact with said trigger means is formed at an end of a block projecting from said inertial body.

18. The mechanical sensor of claim 11 in which a sloped surface is formed between said inertial body and trigger means in such a manner that said sloped surface will guide movement of said trigger means caused by said urging movement of said inertial body in a direction of engaging with said firing pin.

19. An acceleration sensor that ignites an actuator during a sudden deceleration of a vehicle comprising:
   a cylindrical inertial body that moves in an axial direction during said sudden deceleration of said vehicle;
   a firing pin arranged coaxially with said cylindrical inertial body so as to move in said axial direction to strike said actuator;
   trigger means being pivotally provided for holding said firing pin in a position separated from said actuator during a normal state of said vehicle, and releasing said firing pin when said cylindrical inertial body moves;
   urging means for urging a firing pin in a striking direction of said actuator; and
   linear contact means for linearly contacting and maintaining engagement of said trigger means with said firing pin until said cylindrical inertial body is moved a predetermined amount, by acceleration, and for moving said trigger means quickly and sharply away from said firing pin once said inertial body has moved said predetermined amount, parallel to a direction of an axis of said firing pin.

20. The mechanical sensor of claim 19 in which a sloped surface is formed between said Cylindrical inertial body and said trigger means, said sloped surface for guiding said trigger means which is urged by said cylindrical inertial body in a direction for engagement with said firing pin.

* * * * *